United States Patent [19]
Furman et al.

[11] Patent Number: 6,018,568
[45] Date of Patent: *Jan. 25, 2000

[54] VOICE DIALING SYSTEM

[75] Inventors: Daniel Selig Furman, Summit; Steven G. Lanning, Gillette; Benjamin J. Stern, Morris Township, Morris County, all of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,785

[22] Filed: Sep. 25, 1996

[51] Int. Cl.⁷ .......................... H04M 11/00; H04M 1/64; H04M 1/00
[52] U.S. Cl. .................................. 379/93.15; 379/88.03; 379/355
[58] Field of Search ................................ 379/67–68, 71, 379/80–83, 88–89, 93.01, 93.03, 93.15, 110.01, 355, 354, 93.23; 704/243

[56] References Cited

U.S. PATENT DOCUMENTS

| | | | |
|---|---|---|---|
| 4,608,460 | 8/1986 | Carter et al. | 379/88.24 |
| 4,899,377 | 2/1990 | Bauer et al. | 379/354 |
| 4,979,206 | 12/1990 | Padden et al. | 379/88.01 |
| 5,065,425 | 11/1991 | Lecomte et al. | 379/93.05 |
| 5,165,095 | 11/1992 | Borcherding | 379/88 |
| 5,297,183 | 3/1994 | Bareis et al. | 379/88 |
| 5,325,424 | 6/1994 | Grube | 379/93.03 |
| 5,329,608 | 7/1994 | Bocchieri et al. | 704/243 |
| 5,353,336 | 10/1994 | Hou et al. | 379/88.02 |
| 5,369,685 | 11/1994 | Kero | 379/88.03 |
| 5,483,586 | 1/1996 | Sussman | 379/355 |
| 5,488,652 | 1/1996 | Bielby et al. | 379/88.03 |
| 5,717,738 | 2/1998 | Gammel | 379/88.03 |
| 5,737,723 | 4/1998 | Riley et al. | 704/243 |
| 5,802,149 | 9/1998 | Hanson | 379/88.03 |
| 5,822,727 | 10/1998 | Garberg et al. | 704/243 |
| 5,835,570 | 11/1998 | Wattenbarger | 379/88.03 |

FOREIGN PATENT DOCUMENTS

WO 94/23523  10/1994  WIPO  .............................. H04M 3/44

OTHER PUBLICATIONS

Voice Dialing℠—The first speech recognition based service delivered to customer's home from the telephone network; George J. Vysotsky; NYNEX Science & Technology, Inc.; Speech Communication 17 (1195) 235–247.

The Internet Telephony Red Herring; Colin Low; Hewlett Packard XP 0020–43901; May 15, 1996; pp. 1–15.

Primary Examiner—Paul Loomis
Assistant Examiner—George Eng

[57] ABSTRACT

A voice dialing system that includes a voice dialing device and a terminal. The voice dialing device is coupled to the terminal through a network. The voice dialing device stores a telephone directory that includes text-based and voice entries. The terminal is coupled to the voice dialing device through a network and sends to the voice dialing device text-based telephone directory information. The voice dialing device modifies the telephone directory based on the text-based telephone directory information sent by the terminal. At a later time, a subscriber calls and the voice dialing device selects an entry from the telephone directory based on a name spoken by the subscriber. The voice dialing device dials a telephone number retrieved from the selected entry of the telephone directory and connects the subscriber with a called party.

21 Claims, 4 Drawing Sheets

VOICE DIALING SYSTEM

BACKGROUND OF THE INVENTION

1. Field of the Invention

This invention relates to loading directory information for a voice dialing system.

2. Description of Related Art

Conventional network-based speed dial systems such as AT&T voice line, Sprint voice phonecard or NYNEX voice dialing provide subscribers the ability to establish telephone directories in the speed dial system. To establish a telephone directory of parties to be called, a subscriber speaks a "name," usually three times. The repetition is needed to "train" the speed dial system to recognize the speaker's pronunciation of specific language sounds. Each name corresponds to a party and this name is associated with the telephone number of the party. The telephone number is entered through the telephone station keypad. Multiple names and telephone numbers may be entered in the above manner, thus generating a telephone directory.

At a later time, the subscriber may call one of the parties in the telephone directory by calling the speed dial system and speaking the name corresponding to the party to be called. The speed dial system dials the telephone number associated with the name and connects the subscriber to the called party. Thus, the subscriber is relieved from carrying a personal telephone directory and the inconvenience of locating a specific entry of the telephone directory.

While speed dial systems provide the above-described services, the process required to set-up the telephone directory in the speed dial system is inconvenient. Subscribers may only enter telephone numbers through a telephone station, and training the speed dial system is cumbersome. Thus, technological improvements are needed to provide better devices and more efficient methods for creating and maintaining telephone directories in network-based speed dial systems.

SUMMARY OF THE INVENTION

The invention provides a voice dialing system that allows subscribers to load text-based telephone directories into the voice dialing system. Subscribers use a terminal such as a personal computer to create, upload and maintain a text-based telephone directory over a communications network to the voice dialing system.

The voice dialing system permits the subscriber to combine a text-based telephone directory with a voice-trained telephone directory. The combined text-based telephone directory and voice-trained telephone directory form a telephone directory.

Once a telephone directory is created, the voice dialing system responds to a name spoken by the subscriber by comparing the name to a list of names in the telephone directory. When a match is found, the voice dialing system dials the telephone number. The voice dialing system may also perform text-to-voice conversion based on the telephone directory entry to output a voice print to the subscriber. Then the subscriber may confirm that the correct telephone directory entry is selected.

BRIEF DESCRIPTION OF THE DRAWINGS

The invention is described in detail with reference to the following drawings, wherein like numerals represent like elements.

DETAILED DESCRIPTION

Figure 1:
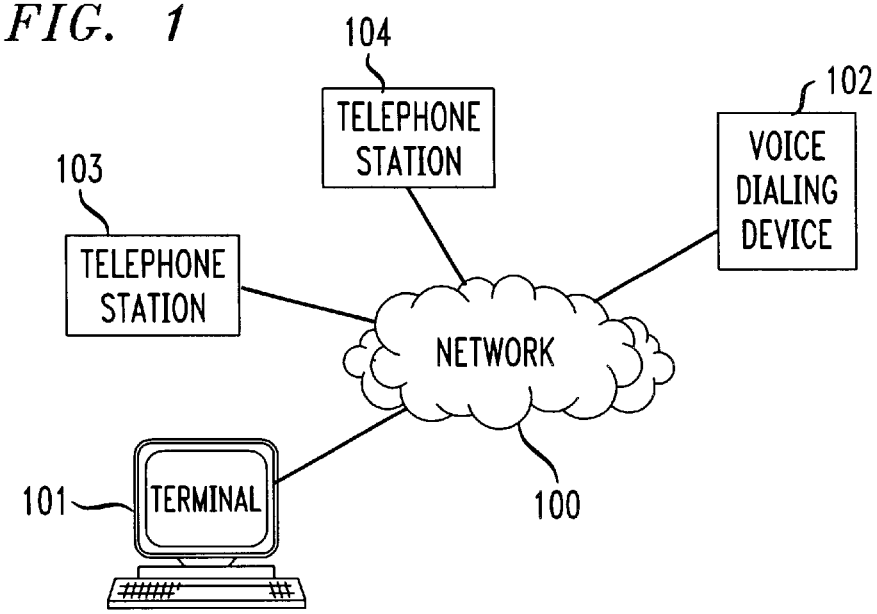
FIG. 1 is a diagram of a voice dialing system that includes a voice dialing device.

FIG. 1 shows a voice dialing system having a network 100, a terminal 101, a voice dialing device 102, and telephone stations 103 and 104. A subscriber prepares a telephone directory using the terminal 101 and uploads the telephone directory to the voice dialing device 102 through the network 100.

Subsequently, the subscriber may call the voice dialing device 102 using the telephone station 103 by dialing an 800 number, for example. When the subscriber speaks a name of a directory entry, the voice dialing device 102 responds by retrieving a telephone number associated with the name of the directory entry. The voice dialing device 102 dials the telephone number and calls a called party through telephone station 104, for example, and connects the subscriber with the called party.

Figure 2:
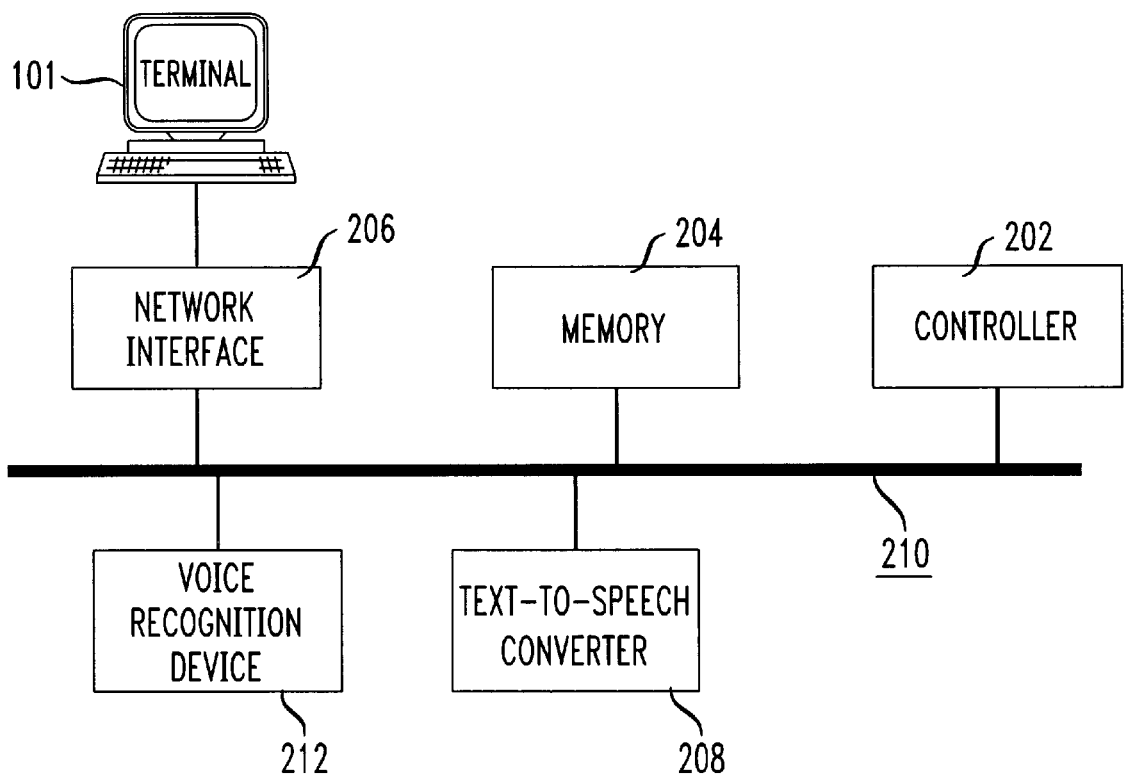
FIG. 2 is a block diagram of the voice dialing device of FIG. 1.

FIG. 2 is a block diagram of the voice dialing device 102. The voice dialing device 102 includes a controller 202, a memory 204, a network interface 206, a voice recognition device 212 and a text-to-speech converter 208. All of the above components are coupled together through signal line 210.

The controller 202 stores the telephone directory in the memory 204 and retrieves an entry of the telephone directory based on the name spoken by the subscriber. The controller 202 interfaces with the subscriber through the network interface 206. The network interface 206 is coupled to the terminal 101 and the telephone stations 103 and 104 through the network 100. The network 100 may include a network such as a voice network and a data network.

There are at least two methods that the subscriber may choose to generate a text-based telephone directory. The subscriber may choose to use the terminal 101, such as a personal computer, to put together the text-based telephone directory using available software such as editors. Then, after the text-based telephone directory is completed, the subscriber may upload the text-based telephone directory from the personal computer to the voice dialing device 102 over the network 100.

The voice dialing device 102 interfaces with the personal computer through the network interface 206. When the subscriber uploads the text-based telephone directory to the voice dialing device 102, the controller 202 receives the text-based telephone directory and stores the text-based telephone directory in a database in the memory 204.

Before uploading the text-based telephone directory, the personal computer may add other information to the text-based telephone directory including subscriber identifying information such as a subscriber ID, a password and a personal identification number (PIN), various flags that identify a particular entry for special purposes, and instructions to the voice dialing device 102. Thus, the personal computer generates text-based telephone directory information by combining the text-based telephone directory with the additional information. The personal computer may also further process the text-based telephone directory information based on other technical needs such as efficiency of the data transfer, and cost.

After the processing of the text-based telephone directory information is completed, the personal computer connects to the voice dialing device 102 by calling the 800 number, for example. The controller 202 of the voice dialing device 102 receives the text-based telephone directory information through the network interface 206 and the signal line 210.

After the text-based telephone directory information is received, the controller 202 performs preliminary tasks such as locating and retrieving the database that contains the telephone directory based, for example, on the subscriber's identifying information. Because the text-based telephone directory information is uploaded by the personal computer, there is no opportunity for the voice dialing device 102 to interact with the subscriber. Thus, if any of the required information is incorrect, the voice dialing device 102 may send an error message and end the upload process.

If all the preliminary tasks are completed successfully, the controller 102 performs the subscriber's instructions that are uploaded with the text-based telephone directory information. The instructions may include requests such as add, delete or change entries of the retrieved telephone directory, or replace the entire telephone directory with an uploaded text-based telephone directory. The controller 202 performs the subscriber's instructions generating a new telephone directory and saves the new telephone directory in the memory 204.

The subscriber may also choose to generate a text-based telephone directory by directly logging-on (logon) to the voice dialing device 102. The subscriber may connect to the voice dialing device 102 either by a logon procedure via a modem of the terminal 101, for example, or through the internet via a web page. Following the logon procedure, the subscriber may generate or manage the text-based telephone directory using convenient programs such as editors provided by the controller 202.

When the subscriber completes generating or managing the text-based telephone directory, thereby making a new telephone directory, the controller 202 stores the new telephone directory in the memory 204. If the subscriber is using the terminal 101 such as a personal computer, the personal computer may update the telephone directory that is stored in the memory of the personal computer so that a faithful copy of the telephone directory is always immediately available to the subscriber. In this way, the telephone directory in the voice dialing device 102 and the telephone directory in the subscriber's personal computer are maintained to be the same.

The telephone directory saved in the memory 204 may include voice-trained entries as well as text-based entries. The subscriber may have an existing voice-trained telephone directory entered by voice training the voice dialing device 102. When the subscriber uploads a text-based telephone directory, the controller 202 combines the new text-based telephone directory and the voice-trained telephone directory.

The controller 202, at the direction of the subscriber, may identify voice-trained telephone directory entries with a "flag." Subsequently, the subscriber can logon to the voice dialing device 102 and download the telephone directory to the terminal 101. The voice-trained telephone directory entries will be displayed and the voice-trained telephone directory entries would be "flagged". The subscriber will then be able to quickly modify the entry, if desired, by, for example, adding additional text-based information to the "flagged" entry. If the terminal 101 is properly equipped, the subscriber may also output the voice-trained telephone directory entry as a voice print to confirm proper identification of the telephone directory entry.

After receiving the text-based telephone directory, the voice dialing system 102 generates a label corresponding to each entry of the telephone directory. This label is a "voice model" that corresponds to the name of each entry. Labels are also generated for voice-trained telephone directory entries so that all entries of the telephone directory have a label based on a common representation. The label in the telephone directory is used by the voice recognition device 212 and the text-to-speech converter 208 to interface with the subscriber.

After a telephone directory is established in the voice dialing system 102 and the subscriber desires to make a call to one of the parties in the telephone directory, the subscriber may call the voice dialing device 102 by dialing a special number that is different from the number used to upload the text-based telephone directory. The controller 202 of the voice dialing device 102 answers the subscriber's call and optionally outputs a welcome message and prompts the subscriber to provide identifying information such as a subscriber ID, and a password. The controller 202 selects a database based on the subscriber's identifying information and loads a subscriber's list of labels containing all the labels of the telephone directory into the voice recognition device 212.

The voice recognition device 212 receives the subscriber's voice and selects one of the labels in the subscriber's list of labels based on the loaded subscriber's list and sends a label index indicating the label of the telephone directory entry selected by the subscriber to the controller 202.

After receiving the label index from the voice recognition device 212, the controller 202 searches the telephone directory for an entry that corresponds to the selected label. When a matching entry is found, the controller 202 retrieves an associated telephone number.

If a voice-trained telephone directory entry is found, the controller 202 sends the selected label of the telephone directory entry to the text-to-speech converter 208 to generate a corresponding voice print and output the voice print to the subscriber. If a text-based telephone directory entry is found, the controller 202 sends the text representation of the telephone directory entry to the text-to-speech converter 208 which converts the text representation into a voice print and outputs the voice print to the subscriber.

In either case, the voice print is output to the subscriber for confirmation that the correct telephone directory entry was selected. When the above voice print is received, the subscriber confirms that the retrieved telephone directory entry is correct by either speaking a command such as "ok" or pressing a key on a keypad. This confirmation process is optional and may be omitted.

After receiving the confirmation (if implemented), the controller 202 dials the associated telephone number and connects the subscriber to the called party through the network interface 206. After the subscriber and the called party are connected, the controller 202 goes on-hook leaving the subscriber and the called party in a call.

Figure 3:
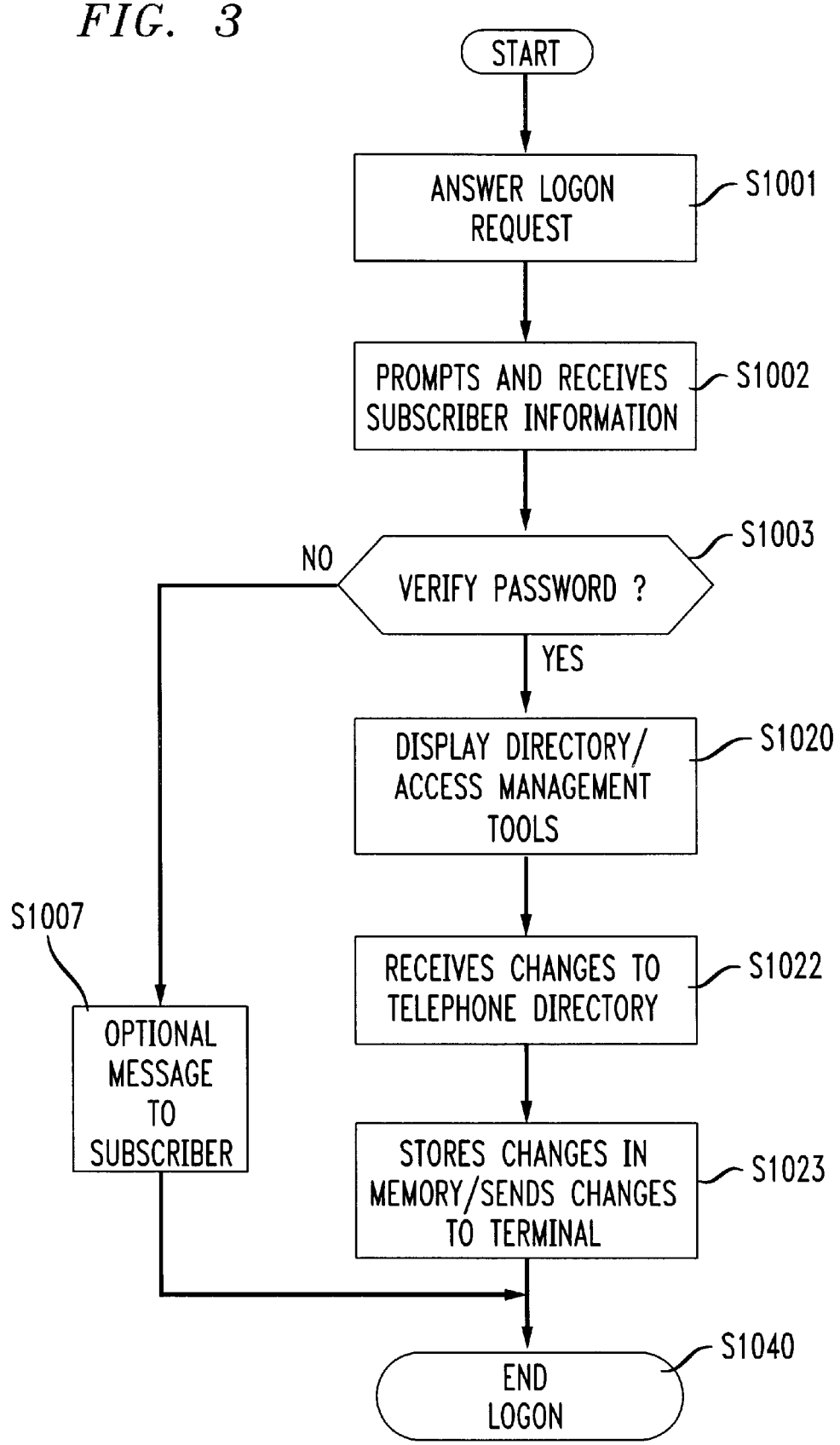
FIG. 3 is a flowchart of a process for establishing a telephone directory in the voice dialing system via logon.

FIG. 3 shows a flowchart of a process for the subscriber to logon to the voice dialing device 102. In step S1001, the controller 202 answers a logon request from the terminal 101 such as a personal computer via a modem and goes to step S1002. In step S1002, the controller 202 prompts and receives subscriber identifying information such as a subscriber ID. The controller searches the memory 204 for a database corresponding to the entered subscriber's identifying information, retrieves the database, and checks if the entered password is correct based on the contents of the database. Then the controller 202 goes to step S1003. In step S1003, if the entered password is incorrect, the controller 202 goes to step S1007. Otherwise, the controller 202 goes to step S1020.

In step S1007, the controller 202 optionally sends a message to the subscriber and goes to step S1040 and ends the logon.

In step S1020, the controller 202 may display the directory on the terminal 101. The controller 202 or the terminal 101 may provide the subscriber access to management tools such as editors so that the subscriber can manage the telephone directory by adding and deleting telephone directory entries or replacing the telephone directory with a new telephone directory. After the subscriber indicates that the telephone directory management is completed, the controller 202 goes to step S1022.

In step S1022, the controller 202 receives changes to the telephone directory or receives a new telephone directory. The controller 202 then goes to step S1023 and stores the telephone directory in the memory 204. Optionally, the controller 202 may download the telephone directory to the terminal 101. In this way, the telephone directory in the voice dialing device 102 and in the terminal 101 are maintained to be the same. Then the controller 202 goes to step S1040 and ends the logon process.

Figure 4:
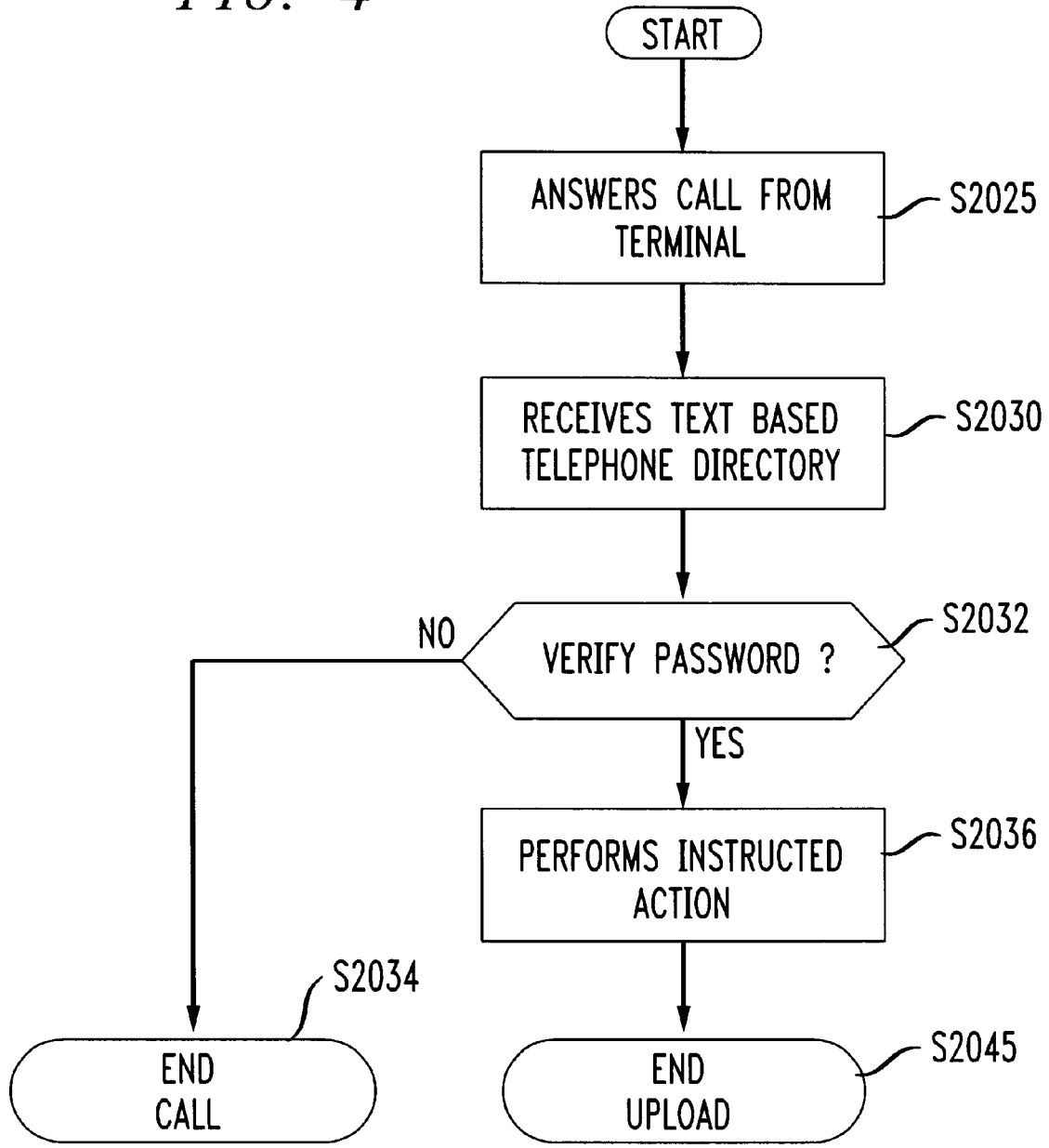
FIG. 4 is a flowchart of a process for establishing a telephone directory in the voice dialing system via uploading.

FIG. 4 shows a flowchart of a text-based directory information uploading process. In step S2025, the controller 202 answers a call from a subscriber's terminal 101 and then goes to step S2030. In step S2030, the controller 202 receives the text-based telephone directory information from the subscriber via network interface 206. The text-based telephone directory information may include information such as a subscriber ID, a password and subscriber instructions. The controller 202 retrieves a database from the memory 204 that corresponds to the subscriber ID and compares the password in the database with the uploaded password to determine if the uploaded password is correct. Then, the controller 202 goes to step S2032.

In step S2032, if the uploaded password is incorrect, the controller 202 goes to step S2034 and ends the call. Otherwise, the controller 202 goes to step S2036. In step S2036, the controller 202 executes subscriber instructions such as updating a telephone directory in the database based on the uploaded text-based telephone directory information. Then the controller 202 goes to step S2045 and ends the uploading process.

Figure 5:
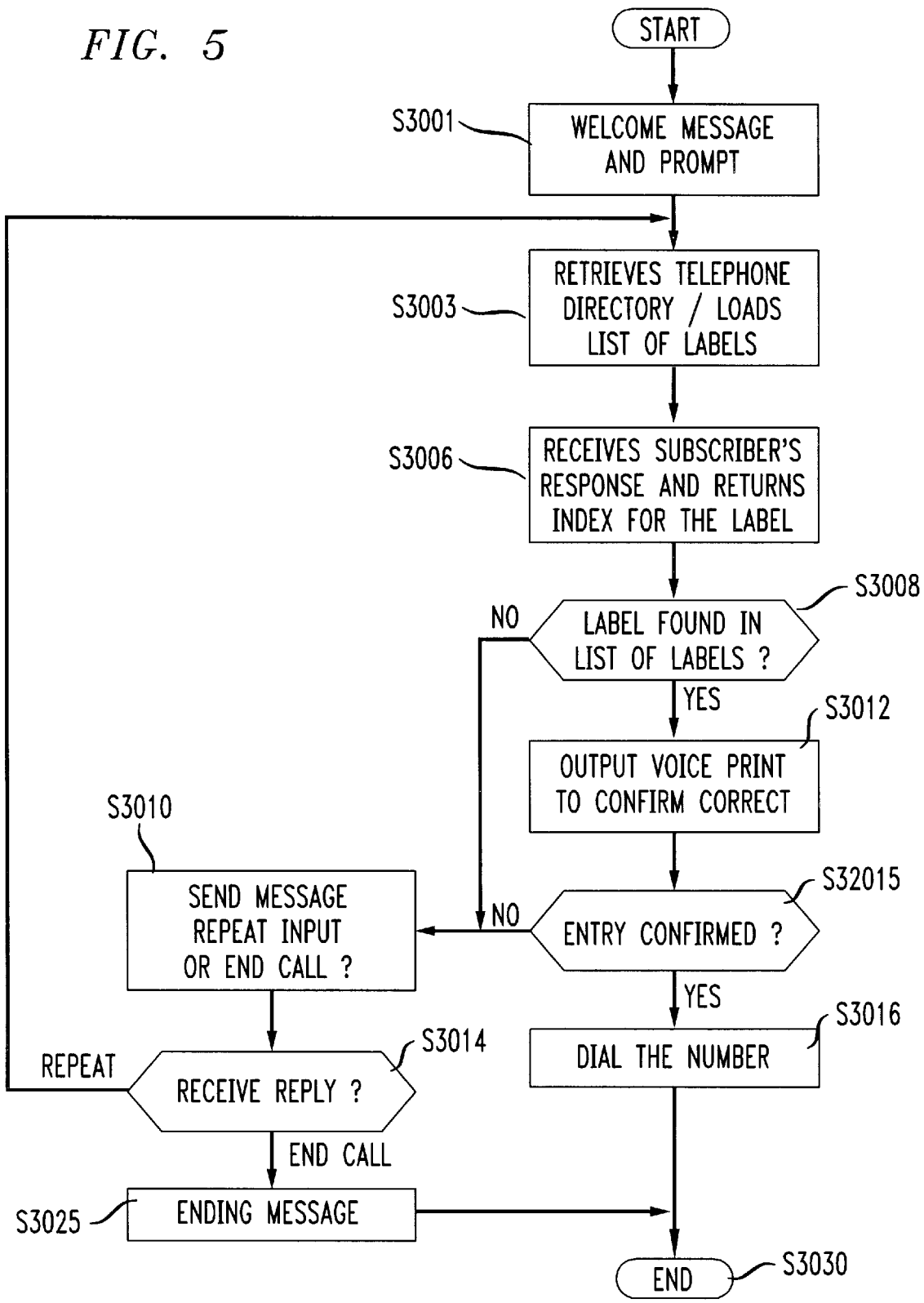
FIG. 5 is a flowchart of a process for placing a call using the voice dialing system.

FIG. 5 is a flowchart of a process for placing a call using the voice dialing device 102. In step S3001, the voice dialing device 102 receives the call and optionally outputs a welcoming message and a prompt to the subscriber for information such as a subscriber ID and a name of a telephone directory entry. Then the controller 202 goes to step S3003.

In step S3003, the controller 202 retrieves the telephone directory from the memory 204 based on the information entered by the subscriber. The controller 202 loads the voice recognition device 212 with subscriber's list of labels for the retrieved telephone directory. Then, the controller goes to step S3006.

In step S3006, the voice recognition device 212 receives the subscriber's response and returns to the controller 202 an index for the label that corresponds to the name spoken by the subscriber or signals the controller 202 that a match is not found. Then the controller 202 goes to step S3008. In step S3008, if the voice recognition device 212 cannot identify a label in the subscriber's list of labels, then the controller 202 goes to step S3010. Otherwise, the controller 202 goes to step S3012. In step S3010, the controller 202 prompts the subscriber to speak a name again or to end the call. The subscriber ends the call by speaking a voice command or pushing a key on a keypad. Then the controller 202 goes to step S3014. In step S3014, the controller 202 returns to step S3003 if the subscriber spoke a name again. Otherwise, the controller 202 goes to step S3025 and optionally outputs an ending message and then ends the call in step S3030.

In step S3012, the controller 202 searches the telephone directory and selects an entry that contains the name spoken by the subscriber. The controller 202 outputs to the subscriber a voice print that corresponds to the selected label to the subscriber. The subscriber is requested to confirm that the correct entry of the telephone directory is selected. The subscriber may indicate confirmation by either a voice command or by pressing a key of a keypad. Then the controller 202 goes to step S3015.

In step S3015, if the subscriber indicates that the selected entry is incorrect, then the controller 202 goes to step S3010. Otherwise, the controller 202 goes to step S3016. In step S3016, the controller 202 dials the telephone number in the selected entry of the telephone directory connecting the subscriber with the called party, then the controller 202 goes to step S3030 and ends the placing a call process.

While this invention has been described with specific embodiments thereof, it is evident that many alternatives, modifications and variations will be apparent to those skilled in the art. Accordingly, preferred embodiments of this invention as set forth herein are intended to be illustrative, not limiting. Various changes can be made without departing from the spirit and scope of the invention as defined in the following claims.

We claim:

1. A voice dialing system usable with a text-based telephone directory and a voice-trained telephone directory, comprising:

a voice dialing device; and a terminal coupled to the voice dialing device through a network, the terminal inputting information from the text-based telephone directory to the voice dialing device through the network, the voice dialing device generating a subscriber-specific telephone directory based on one of a voice entry from a telephone station and the information from the text-based telephone directory input to the voice dialing device, wherein generating the subscriber-specific telephone directory generates a label for each voice entry and each of the information from the text-based telephone directory so that all entries of the subscriber-specific telephone directory have a label based on a common representation, wherein, at a later time, the voice dialing device dials a telephone number of the subscriber-specific telephone directory in response to a name input from the telephone station or another telephone station, and wherein the terminal is a computer and the network is a communication network.

2. The voice dialing system of claim 1, wherein the terminal sends the information from the text-based telephone directory to the voice dialing device by either uploading the information from the text-based telephone directory to the voice dialing device or logging on to the voice dialing device and entering the information from the text-based telephone directory in the voice dialing device after logging on to the voice dialing device.

3. The voice dialing system of claim 2, wherein the voice dialing device comprises:

a network interface coupled to the network; and a controller coupled to the network interface, wherein the controller receives the information from the text-based telephone directory from the terminal through the network interface.

4. The voice dialing system of claim 3, wherein the controller generates the subscriber-specific telephone directory by one of creating and modifying the subscriber-specific telephone directory based on an instruction in the information from the text-based telephone directory.

5. The voice dialing system of claim 4, wherein the instruction includes at least one of load data as the subscriber-specific telephone directory, add the data as a new entry to the subscriber-specific telephone directory, delete an entry in the subscriber-specific telephone directory and replace the entry in the subscriber-specific telephone directory with the data, the data being included in the information from the text-based telephone directory.

6. The voice dialing system of claim 3, wherein the voice dialing device further comprises:

a memory device coupled to the controller, the controller selecting a database in the memory device based on identification data included in the information from the text-based telephone directory, the controller either creating the subscriber-specific telephone directory and storing the subscriber-specific telephone directory in the database in the memory device or retrieving the subscriber-specific telephone directory from the memory, modifying the retrieved subscriber-specific telephone directory and storing the modified subscriber-specific telephone directory in the database in the memory process.

7. The voice dialing system of claim 6, wherein the controller one of creates and modifies the subscriber-specific telephone directory if a password included in the information from the text-based telephone directory is correct, the password being correct if the password matches a password in the database and incorrect otherwise, and wherein, when the terminal sends the information from the text-based telephone directory to the voice dialing device through the logon process, the controller ends the logon process.

8. The voice dialing system of claim 3, wherein the voice dialing device further comprises:

a voice recognition device coupled to the controller, the voice recognition device converting the name input from the telephone station into an index label from a list of labels input from the controller, the controller selecting an entry of the subscriber-specific telephone directory based on at least one of a name entered through a keypad of the telephone station and the index and dialing the telephone number contained in the selected entry.

9. The voice dialing system of claim 8, wherein the voice dialing device further comprises:

a text-to-speech device coupled to the controller, if the selected entry contains a text representation of the selected entry, the text-to-speech device converting the text representation of the selected entry into speech and outputting the speech to a subscriber for confirmation that the selected entry of the subscriber-specific telephone directory is a correct entry of the subscriber-specific telephone directory.

10. The voice dialing system of claim 2, wherein if the terminal inputs the information from the text-based telephone directory by uploading, the information from the text-based telephone directory is prepared in the terminal and then uploaded to the voice dialing device.

11. The voice dialing system of claim 2, wherein the terminal logs on to the voice dialing device either directly or through a page of an internet.

12. The voice dialing system of claim 1, wherein the subscriber-specific telephone directory includes entries from at least one of a text-based telephone-directory entry and a voice-trained telephone directory entry.

13. The voice dialing system of claim 12, wherein each of the entries of the subscriber-specific telephone directory includes flags that correspond to each of the entries, one of the flags indicating the corresponding entry of the subscriber-specific telephone directory is a voice-trained directory entry, another of the flags indicating the corresponding entry of the subscriber-specific telephone directory is a text-based telephone directory entry.

14. The voice dialing system of claim 1, wherein a copy of the subscriber-specific telephone directory is maintained in the terminal.

15. A method for operation of a voice dialing system usable with a text-based telephone directory and a voice-trained telephone directory, comprising:

inputting information from the text-based telephone directory to a voice dialing device from a terminal through a network, wherein the terminal is a computer and the network is a communication network;

sending a voice entry to the voice dialing device from a telephone station;

generating a subscriber-specific telephone directory based on one of the voice entry and the information from the text-based telephone directory input to the voice dialing device, wherein generating the subscriber-specific telephone directory generates a label for each voice entry and each of the information from the text-based telephone directory so that all entries of the subscriber-specific telephone directory have a label based on a common representation; and dialing a telephone number of the subscriber-specific telephone directory in response to a name input from the telephone station or another telephone station.

16. The method of claim 15, wherein the inputting step comprises one of uploading the information from the text-based telephone directory to the voice dialing device and logging on to the voice dialing device, when logging on to the voice dialing device, the information from the text-based telephone directory being entered in the voice dialing device after logging on.

17. The method of claim 15, wherein the generating step comprises one of creating and modifying the subscriber-specific telephone directory based on an instruction in the information from the text-based telephone directory, a controller of the voice dialing device receiving the information from the text-based telephone directory through a network interface and creating or modifying the subscriber-specific telephone directory based on the received information from the text-based telephone directory.

18. The method of claim 17, further comprising:

selecting a database in the memory device based on identification data included in the subscriber-specific text-based telephone directory information, the controller either creating the subscriber-specific telephone directory and storing the subscriber-specific telephone directory in the database in the memory device or retrieving the subscriber-specific telephone directory from the memory device, modifying the retrieved subscriber-specific telephone directory and storing the modified subscriber-specific telephone directory in the database in the memory device.

19. The method of claim 15, further comprising:

converting the name input from the telephone station using a voice recognition device into an index label from a subscriber's list input from a controller of the voice dialing device, the controller selecting an entry of the subscriber-specific telephone directory based on the name input through the telephone station and dialing the telephone number contained in the selected entry.

20. The method of claim 19, further comprising:

converting a representation of the selected entry of the subscriber-specific telephone directory into a voice print and outputting the voice print to a subscriber for confirmation that the selected entry of the subscriber-specific telephone directory is a correct entry of the subscriber-specific telephone directory.

21. The method of claim 15, further comprising:

maintaining a copy of the telephone directory in the terminal.

* * * * *